May 5, 1931. A. ARUTUNOFF 1,804,076

WIRE FOR WINDING MOTORS, ETC

Filed Sept. 8, 1928

Inventor
A. Arutunoff,

By George A. Prevost
Attorney

Patented May 5, 1931

1,804,076

UNITED STATES PATENT OFFICE

ARMAIS ARUTUNOFF, OF BARTLESVILLE, OKLAHOMA

WIRE FOR WINDING MOTORS, ETC.

Application filed September 8, 1928. Serial No. 304,820.

My invention consists in new and useful improvements in wire for winding electric motors and other apparatus, and has for its object to provide a wire of given diameter, with the maximum flexibility.

Heretofore, in winding electric motors or other apparatus through which a strong current was to be transmitted, a multiplicity of parallel wires has been employed. It is obvious that by using a single wire of large diameter, better use may be made of the space provided for winding, and more efficient insulation afforded. However, the comparative non-flexibility of solid wire of large diameter has prevented such use.

It is, therefore, the object of my invention to employ a wire of large diamter, constructed to overcome the disadvantages heretofore encountered.

It is a further object of my invention to provide a wire which will decrease the losses while transmitting alternating current.

With the above and other objects in view which will appear as the description proceeds, my invention consists in the novel features herein set forth, illustrated in the accompanying drawings, and more particularly pointed out in the appended claims.

Figure 1:
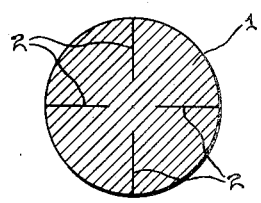
Figure 2:
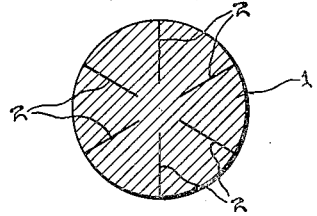
Figure 3:
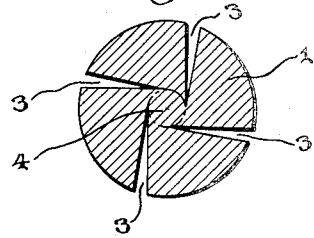
Figure 4:
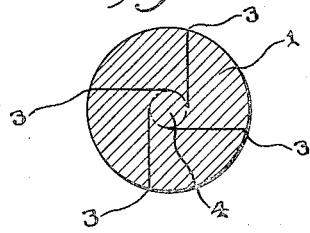
Figure 5:
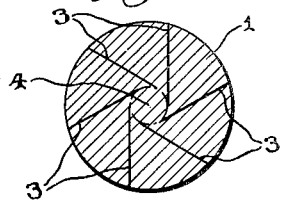
Figure 6:
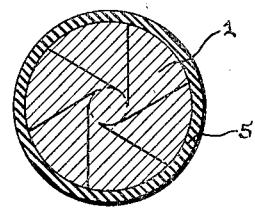
Figure 7:
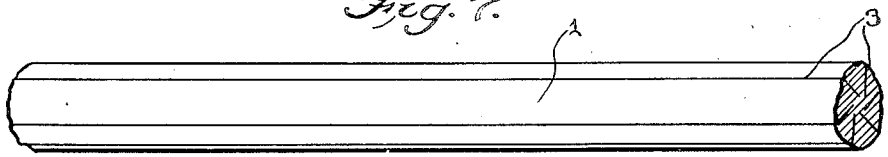

Referring to the drawings, in which numerals of like character designate similar parts throughout the several views, Figs. 1 and 2 are cross sections of wires embodying one form of my invention, Fig. 3 is a sectional view of a wire slotted longitudinally in accordance with my invention, Fig. 4 is a sectional view of the wire shown in Fig. 3, after the same has been drawn through a dye for closing the slots, Figs. 5 and 6 are similar views of a wire before and after the insulation has been applied, and Fig. 7 is a perspective view of a section of wire constructed in accordance with my invention.

In Figs. 1 and 2 of the drawings, 1 represents a body of wire split longitudinally as at 2, in lines radiating from the center of the wire. It is obvious that as many slits as necessary may be provided, but for the purposes of illustration, I have shown four and six slits respectively.

In Fig. 3, I have shown a different embodiment of my invention, wherein the wire is provided with four substantially V-shaped slots extending longitudinally thereof, as at 3. The slots 3 are arranged with at least one wall tangential to an imaginary circle 4, through the center of the wire 1, for the purpose of strengthening the center of said wire, yet permitting the maximum flexibility thereof.

After the wire is slotted, as just described, it is drawn through a suitable dye, not shown, whereby the slots 3 are closed, and the wire reduced to the desired diameter, as clearly shown in Fig. 4. In order to prevent losses, it may be advisable to provide a coating of varnish on the walls of the slots 3, before the wire is drawn through the dye. The wire may also be slightly twisted if desired.

While I have described the wire as provided with four slots, it is obvious that more or less may be employed if desired, to suit the varying conditions. Thus, in Fig. 5, I have shown a wire provided with six slots. It is also obvious that a suitable insulation 5 may be employed around the wire 1, as shown in Fig. 6.

It will thus be seen that I have provided an insulated wire for winding electric motors and other apparatus, which has an increased conductivity and decreased losses while transmitting alternating current, yet at the same time, has the maximum flexibility.

From the foregoing, it is believed that my invention may be clearly understood by those skilled in the art without further description, it being borne in mind that numerous changes may be made in the details of construction, without departing from the spirit of the invention, as set forth in the following claims.

What I claim and desire to secure by Letters Patent is:

1. Wire for winding electric motors and apparatus, comprising a longitudinal core, a body portion surrounding said core and integral therewith, said body being provided with a series of longitudinally extending, substantially closed slits, radiating from the boundaries of said core, whereby flexibility of the wire is facilitated.

2. Wire for winding electric motors and apparatus, comprising a longitudinal core, a body portion surrounding said core and integral therewith, said body being provided with a series of longitudinally extending, substantially closed slits, radiating from the boundaries of said core and tangential thereto, whereby flexibility of the wire is facilitated.

3. Wire for winding electric motors and apparatus, comprising a longitudinal core, a body portion surrounding said core and integral therewith, said body being provided with a series of longitudinally extending slits, the walls of which are coated with an insulating material and substantially closed, said slits radiating from the boundaries of said core and tangential thereto, whereby flexibility of the wire is facilitated.

4. A wire as claimed in claim 3, provided with an insulating cover.

In testimony whereof I affix my signature.

ARMAIS ARUTUNOFF.